United States Patent [19]

Achorn et al.

[11] 4,377,406
[45] Mar. 22, 1983

[54] AMMONIUM POLYPHOSPHATE SULFATE FERTILIZERS FROM WET-PROCESS PHOSPHORIC ACID

[75] Inventors: Frank P. Achorn, Killen; Kenneth E. McGill, Sheffield, both of Ala.

[73] Assignee: Tennessee Valley Authority, Muscle Shoals, Ala.

[21] Appl. No.: 336,662

[22] Filed: Jan. 4, 1982

Related U.S. Application Data

[63] Continuation-in-part of Ser. No. 285,213, Jul. 20, 1981, now Defensive Publication No. T101,901.

[51] Int. Cl.$^3$ ............................................... C05B 1/06
[52] U.S. Cl. ........................................ 71/36; 71/43; 71/6; 423/310; 423/313
[58] Field of Search .................. 71/34, 36, 37, 40, 41, 71/43, 64.08, 64.09, 64.10; 423/309, 310, 313, 315

[56] References Cited

U.S. PATENT DOCUMENTS 3,310,371  3/1967  Lutz .................................... 423/310
3,954,942  5/1976  Achorn et al. ...................... 71/43 X
4,127,400  11/1978 Petersen et al. ................. 71/64.08 X

*Primary Examiner*—Ferris H. Lander
*Attorney, Agent, or Firm*—Robert A. Petrusek

[57] ABSTRACT

A process for the production of fluid fertilizers (suspensions and/or solution type) made from merchant-grade phosphoric acid (50-58 percent $P_2O_5$), sulfuric acid, liquid anhydrous ammonia, and water, wherein liquid ammonia is heated in heat exchange means juxtaposed hot fertilizer product to form gaseous ammonia, which gaseous ammonia, along with phosphoric acid and sulfuric acid, is fed to a pipe-cross reactor wherein a melt of ammonium polyphosphate sulfate is formed, which melt is subsequently mixed with cooled recycled product to produce a fluid fertilizer with N:$P_2O_5$ weight ratios ranging from about 0.3 to 1, which contains from about 10 to 60 percent of its $P_2O_5$ values in the form of polyphosphates and 3 to 8 percent by weight sulfur. About 45 percent of the $P_2O_5$ as polyphosphate is easily attainable in the product with ambient acid feed temperatures, i.e., about 50° F. to 100° F., versus prior-art teachings of only about 15 percent poly formation with preheat of the feed acids. It is a solution when it is produced, and when diluted with 10 percent by weight water, it can be stored at 40° F. without the formation of troublesome crystals. When gelling clay is added, it stores well as a suspension and remains fluid at temperatures as low as −25° F.

2 Claims, 2 Drawing Figures

FLOWSHEET FOR PRODUCTION OF AMMONIUM POLYPHOSPHATE SULFATE FLUIDS

FLOWSHEET FOR PRODUCTION OF AMMONIUM POLYPHOSPHATE SULFATE FLUIDS

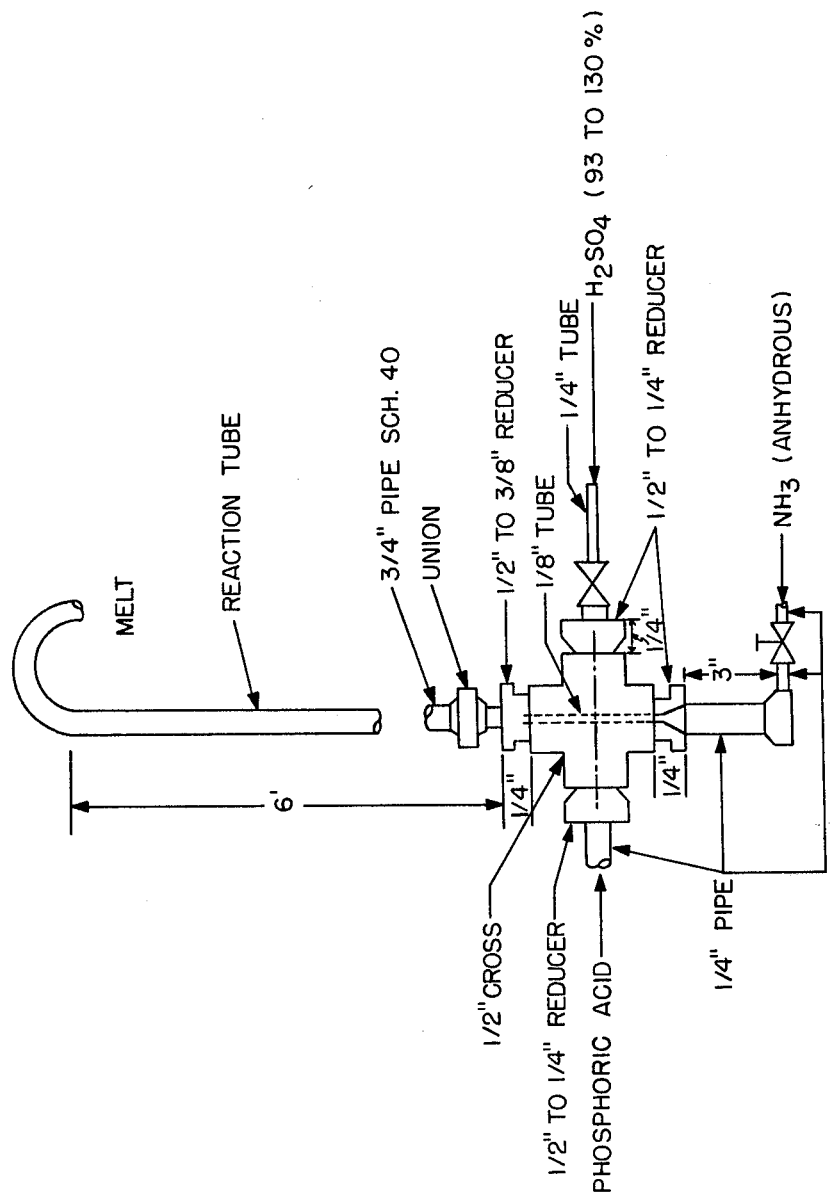
FIG. 2 DETAIL OF PIPE CROSS FOR JOINING PHOSPHORIC ACID, $NH_3$, AND $H_2SO_4$

AMMONIUM POLYPHOSPHATE SULFATE FERTILIZERS FROM WET-PROCESS PHOSPHORIC ACID

The invention herein described may be manufactured and used by or for the Government for governmental purposes without the payment to us of any royalty therefor.

This application is a continuation-in-part of our co-pending application Ser. No. 285,213, filed July 20, 1981, for AMMONIUM POLYPHOSPHATE SULFATE FERTILIZERS FROM WET-PROCESS PHOSPHORIC ACID, now U.S. Defensive Publication No. T 101,901, June 1, 1982.

Our invention relates to an improvement in processes for the production of fertilizers from phosphoric acid, sulfuric acid, and ammonia; more particularly the present invention relates to improved processes for the production of high-analysis ammonium polyphosphate sulfate. Still more particularly the present invention relates to a process for the production of fluid fertilizers made from wet-process phosphoric acid, sulfuric acid, liquid anhydrous ammonia, and water. Even still more particularly the present invention relates to such processes wherein liquid ammonia is heated in heat exchange means juxtaposed hot fertilizer product to form gaseous ammonia, which gaseous ammonia along with phosphoric acid and sulfuric acid is fed to a pipe-cross reactor wherein a melt of anhydrous ammonium polyphosphate sulfate is formed, which melt is subsequently mixed with cooled recycle product in order to produce fertilizer fluids with $N:P_2O_5$ weight ratios ranging between 0.3 and 1 including, for example, a nominal 12-31-0-3S grade fertilizer which contains from about 10 to about 60 percent of its $P_2O_5$ values in the form of polyphosphates.

This process utilizes available energy, even that from the heat of dilution generated from the phosphoric acid and sulfuric acid, which is premixed effectively before feeding the acids to the pipe-cross reactor. Furthermore, intimate mixing of the acids before reaction with the ammonia should result in more effective utilization of the total heat by the phosphate in production of polyphosphates. The entire scheme in its entirety utilizes only process energy thereby eliminating the need for supplying any external energy and thereby saving more energy.

Fluid fertilizers having compositions similar to those of standard dry mixed fertilizers are well known in the industry and are increasing in popularity. Such fluids have the advantages over dry mixed fertilizers in that costs of evaporating water and bagging are eliminated and application to the soil is greatly simplified. Moreover, the use of fluid fertilizers eliminates difficulty due to segregation and caking often encountered in the storing of dry fertilizers.

The art of producing fluid fertilizers, both liquids and suspensions, is well known and fully described in the literature. See, for examples, the following U.S. Pat. Nos.: 2,950,961, Striplin et al, Aug. 30, 1960; 3,015,552, Striplin et al, Jan. 2, 1962; 3,109,729, Slack et al, Nov. 5, 1962; 3,113,858, Slack et al, Dec. 10, 1963; 3,326,666, Walters, June 20, 1967; 3,096,170, Newsome, July 2, 1963; 3,234,004, Smith et al, Feb. 9, 1966; 3,148,970, Smith et al, Sept. 15, 1964; 3,697,247, Jones et al, Oct. 10, 1972; 3,382,059, Getsinger, May 7, 1968; 3,192,013, Young, June 29, 1965; 3,813,233, Kendrick, May 28, 1974; 3,697,247, Jones and Frazier, Oct. 10, 1972; and 4,066,432, Jones, Jan. 3, 1978.

The most common method of producing both liquid and suspension fertilizers containing nitrogen and phosphate is by ammoniation of phosphoric acids. In the early 1950's electric furnace orthophosphoric acid, which is relatively free of impurities, was ammoniated to form 8-24-0 grade liquid fertilizer.

However, liquid fertilizers that contain all of their phosphorus values as the ortho form of the numerous acyclic species have some outstanding disadvantages. The solutions are limited to a maximum plant food content of about 33 percent by weight because experience has taught that concentration in excess of this amount always has resulted in crystallization and precipitation of soluble salts. Furthermore, liquids that contain all of their phosphorus values as the ortho form of the numerous acyclic species derived from phosphoric acid of the wet-process type contain precipitated metallic impurities originally present in said wet-process phosphoric acid. These disadvantages, in many instances, outweighed the benefits derived by elimination of the evaporation and bagging steps associated with solid fertilizers.

In a fairly recent breakthrough in overcoming the disadvantages of liquid fertilizers produced by the prior-art methods, there is found in U.S. Pat. No. 3,044,851, D. C. Young, the discovery that if phosphoric acid of the wet-process type containing up to a maximum of about 54 percent $P_2O_5$ is subjected to evaporating means, either at atmospheric or at reduced pressure, so as to condense the wet acid and raise its $P_2O_5$ content up to the range of approximately 60 to 76 percent $P_2O_5$, the formation of metallic precipitates which otherwise render wet-process phosphoric acid unusable for the preparation of liquid mixed fertilizers are substantially sequestered. In addition, there is taught in said patent that if wet-process phosphoric acid is so concentrated, it may then be subsequently ammoniated to form liquid mixed fertilizers in which the metallic impurities originally present in said wet-process phosphoric acid remain sequestered and in solution.

Still another and more recent breakthrough is found in U.S. Pat. No. 3,382,059, Getsinger, wherein he produced liquid fertilizers from orthophosphoric acid of the wet-process type and ammonia and wherein he circumvents or eliminates the separate heating and concentrating step found in the disclosure of Young. In this later work, Getsinger has discovered that by combining orthophosphoric acid of the wet-process type and anhydrous ammonia in a direct method, he is able to utilize the autogenous heat of reaction therein to effect the release of water from such acid whereby same is condensed while it is being ammoniated to form directly, without the separate heating and concentrating step, ammonium polyphosphate solutions. However, as is pointed out by Siegel et al in a subsequent patent (U.S. Pat. No. 3,562,778), unless ammoniation of the orthophosphoric acid of the wet-process type is carried out in a specified manner, unavailable $P_2O_5$ will be formed which not only will precipitate rapidly from the liquid fertilizer true base solution, but which will be essentially unavailable to the growing plant. Meline and Lee (U.S. Pat. No. 3,733,191) were able to overcome the unavailable $P_2O_5$ problem encountered when attempting to use impure wet-process acid in the Getsinger process by incorporating the ammoniation procedure described by Siegel et al using a "T" mixer. Meline and Lee, like Getsinger, encountered a number of problems with foaming which they were able to overcome by incorporation of equipment to separate steam and unreacted ammonia from the "T" mixer product, but this equipment was complicated and expensive to build and maintain. Operation of their process yielded solutions which could be converted into fertilizer suspension. A description of the equipment used by both Getsinger (in U.S. Pat. No. 3,382,059) and Meline et al (in U.S. Pat. No. 3,733,191) showed that both used a scrubber or preneutralizer to capture unreacted ammonia and evaporate a portion of the water from the feed orthophosphoric acid, a reactor or disengager where the polyphosphate was formed, and a third vessel where the molten ammonium polyphosphate was dissolved in water or aqua ammonia to make the liquid fertilizer. A cooler to lower the temperature of the liquid fertilizer to the storage temperature was also incorporated in both processes.

Another possible approach to producing an ammonium polyphosphate liquid fertilizer is described in U.S. Pat. No. 4,185,075, Ellis et al, which details an apparatus for reacting phosphoric acid and ammonia to which water can be added to produce an ammonium polyphosphate product. Although the apparatus is claimed to be a single reactor to eliminate what is claimed to be a viscosity problem inherent in the first stage of a two-stage ammoniation process, a close examination of their single-stage apparatus reveals that they combine both stages into one vessel which must only magnify the problem they were trying to overcome since water is always added in the reaction section of their apparatus to build up pressure and blow their reaction melt from the reaction chamber. In fact, Ellis et al state in several places that steam is needed to build up pressure in the reaction zone to propel the reaction mixture through the reaction zone and to expel the reaction mixture from the reaction zone. Kearns (in U.S. Pat. No. 3,464,808) also indicates that pressure is necessary to expel his reaction melt through the small opening in his jet reactor prior to dissolving the molten ammonium polyphosphate in water to produce a liquid fertilizer. Evidently, although not specifically stated, Ellis et al's apparatus must not be able to function properly unless additional water is fed to the reaction zone.

Thus, although much research has been devoted over the years to producing a liquid fertilizer true base solution from orthophosphoric acid of the wet-process type, none of the processes developed to date have been entirely successful in that the equipment has been complex and difficult to operate and maintain, sometimes must be operated under pressure, and essentially all of the processes required some type of a prereactor to evaporate a portion of the water from the phosphoric acid prior to formation of significant amounts of polyphosphate. The process that comes closest to producing a true solution in simple equipment in Meline's U.S. Pat. No. 3,775,534, in which he uses a "common pipe" in which "all or part of the ammonia" is reacted with the expensive "wet-process superphosphoric acid, i.e., acid containing at least some nonortho species" and this resultant melt is subsequently dissolved in water or aqua ammonia in a solution reaction vessel. Again, this process requires water to be evaporated from the orthophosphoric acid prior to formation of the polyphosphate. This ammonium polyphosphate liquid fertilizer true base solution containing at least about 80 percent of the $P_2O_5$ as polyphosphate is then rapidly cooled to prevent hydrolysis of the polyphosphate. Although not known at the time, the "common pipe" reactor disclosed by Meline had a problem with buildup on the walls of the pipe of the same unavailable $P_2O_5$ described by Siegel et al in U.S. Pat. No. 3,562,778, which eventually caused the pipe reactor to become plugged and caused operations to cease. At the current time the more than one hundred commercial plants using this common pipe reactor have devised a number of ways of cleaning out the pipe reactor after it has become plugged but none have devised a way to prevent the buildup of unavailable $P_2O_5$ from clogging the pipe reactor. Thus, in spite of the best efforts of numerous researchers, the production of a liquid fertilizer true base solution is still difficult, expensive, and not without equipment operating problems.

Since wet-process merchant-grade phosphoric acid costs less per unit of $P_2O_5$ than superphosphoric acids, which contain polyphosphates that sequester impurities, or electric furnace orthophosphoric acids, which contain little or no impurities, the use of merchant-grade acid in preparation of suspension fertilizers has often been attempted. Merchant-grade acid is defined in the 1980 issue of *Farm Chemicals Handbook* as phosphoric acid containing 51 to 54 percent $P_2O_5$ and less than one percent of suspended solids[a]. However, the grades of the fluid fertilizers produced from such merchant-grade acid have been found to be substantially lower in $P_2O_5$ values than the feed acid because of numerous factors, including impurities which precipitate as amorphous compounds with gel-like characteristics when such acids were ammoniated. The gelatinous properties of the precipitated impurities often completely destroyed the fluidity of the high-grade products and made it necessary to dilute them with water to thereby lower the grade at the time of production in order to prevent excessive thickening or gelation in pumps, pipelines, and storage tanks because once such materials in the pumps, pipelines, valves, tanks, etc., attain semisolid condition, it is extremely difficult to restore the fluidity.

[a]Others in the industry claim merchant-grade acid contains 50-58 percent $P_2O_5$.

Of the various methods and means available to the industry for manufacturing fertilizer suspensions from wet-process phosphoric acid one current process described by Jones in U.S. Pat. No. 4,066,432 seems to exemplify the best state of the art that allows for production of orthophosphate suspensions by ammoniation of low-cost wet-process orthophosphoric acid or other impure phosphoric acids in such a manner as to form concentrated $N-P_2O_5$ suspensions without formation of the usually occurring amorphous or gelatinous precipitates which cause high viscosity and nonpourability.

The orthophosphate suspension fertilizer made by Jones adds to, opens up, and makes workable this less expensive route for producing high-quality, high-analysis suspension fertilizers of a type that has low viscosity (free from metallic impurity gels), will not settle during transit, and has excellent long term warm weather storage properties. The theory behind Jones' invention is that high-analysis suspension fertilizers must be manufactured with a large abundance of small (thin) equilibrium-type crystals which are near in density to that of the solution phase, otherwise they will settle during vibration such as that which occurs during transit by rail. Furthermore, due to the great abundance of thin crystals, none will grow large or thick during storage and cooling.

The Jones process consists of ammoniating wet-process or other orthophosphoric acids in a first-stage boiling reactor to a pH (sample diluted 1:4H$_2$O) in the range of about 3.5 to 5.0 (N:P$_2$O$_5$ ratio about 0.20 to 0.23), for prevention of formation of gel-like metallic impurity compounds. Subsequently, in a second stage, the resulting partially ammoniated acid is cooled to the range of 160° F. to 220° F. and further ammoniated to increase the N:P$_2$O$_5$ ratio from about 0.20 to 0.23 up to about a maximum of about 0.24. The material from this second stage of Jones' process is then cooled in another vessel to about 120° F., or lower, for production of a slurry containing only monoammonium phosphate crystals (N:P$_2$O$_5$ ratio up to about 0.28, depending upon the temperature) or both mono- and small diammonium phosphate (N:P$_2$O$_5$ ratio up to about 0.34, also dependent on temperature) crystals. Ammonia is then added rapidly in a third stage, such as a cooler, clay mixer, or other separate vessels for conversion of monoammonium phosphate crystals to diammonium phosphate crystals (N:P$_2$O$_5$ ratio 0.35 to about 0.37) without increasing the temperature in excess of about 110° F. Only small (thin) crystals of diammonium phosphate are found present in the product. These crystals do not settle and pack on the bottom of the container during vibration such as occurs during transit in railroad tank cars. Furthermore, an added benefit, freedom from pollution as ammonia losses and entrained particles during the manufacturing steps, is obtained.

A large number of fluid fertilizer dealers are located in the colder regions of the United States and it is not unusual for them to handle their fluids at temperatures as low as 0° F., or lower. Orthophosphate suspensions prepared by prior-art processes including the Jones process, supra, become too thick to pump or handle at these temperatures whereas fluids containing polyphosphates remain fluid and free-flowing at temperatures of 0° F. or lower.

Achorn et al (in U.S. Pat. No. 3,954,942) showed those skilled in the art that granular orthophosphate fertilizers, specifically grades of 6-24-24, 12-12-12, 8-32-16, 8-22-11, and 12-48-0, could be produced in a "pipe cross and an extension of the pipe beyond the cross." Achorn added ammonia, water, phosphoric acid, and sulfuric acid to the pipe cross in his disclosure to produce a granular orthophosphate fertilizer. Achorn added sufficient water to the pipe-cross reactor so that no polyphosphate would be formed; granulation of the melt was better without polyphosphate. Norton et al in U.S. Pat. No. 4,134,750 had equipment similar to Achorn et al but did not, in some cases, add as much water (column 10, table III, U.S. Pat. No. 4,134,750) and produced "a monoammonium phosphate sulfate containing up to about 30 percent of its P$_2$O$_5$ as polyphosphate" (column 20, claim 2, U.S. Pat. No. 4,134,750); this phosphate level was about as high as Norton et al or others skilled in the art can granulate. Norton et al did not teach producing a liquid or suspension from any of his products.

Our invention is similar to Achorn et al and Norton et al in that we utilize similar equipment. We discovered that an ammonium polyphosphate sulfate suspension with a N:P$_2$O$_5$ weight ratio ranging from 0.3 to 1 (preferably ranging from 0.3 to 0.4) and when containing 40 to 46 percent N+P$_2$O$_5$ has excellent storage and handling properties at low temperatures such as −25° F. Unlike the pipe-cross reactor used for the production of granular ammonium phosphate sulfate and ammonium phosphates, as shown in U.S. Pat. No. 3,954,942, Achorn et al, and in U.S. Pat. No. 4,134,750, Norton et al, the reactor utilized in the present invention has an inverted "U" type configuration. After the melt from the pipe-cross reactor has been thoroughly mixed with additional recycled liquid, quantities of ammonia, and water, it is cooled. This cooling can be accomplished by passing the product through a heat exchanger along with ammonia used in the process. Additional cooling also can be obtained, if required, by passing the product through an evaporative type cooler. The resulting product has a pH that ranges from about 5.8 to about 7.0 and the specific gravity of the product ranges from about 1.3 to about 1.5. The process results in the formation of ammonium polyphosphate sulfate without the need for superphosphoric acid feed material. This is accomplished by utilizing the heat of reaction between phosphoric acid, sulfuric acid, and anhydrous ammonia. Several products have been produced with various polyphosphate contents. In one test, a 12.8-31.5-0-3.0S base solution was produced from acids that were at ambient temperatures (80° F.). The resulting polyphosphate content of this product was 45 percent. In another test, a 12.3-31.5-0-3S grade base solution was produced using phosphoric acid that had been heated to 180° F. and sulfuric acid at 80° F. The resulting product had a polyphosphate content of 52 percent. This product was diluted with water to a 11.1-28.4-0-2.8 grade and stored for several weeks at 40° F. No crystals formed in the solution at this temperature. A control test was conducted in which no sulfuric acid was used in the formulation and the acid was heated to 180° F. Under these conditions, the product contained only 37 percent polyphosphate. Other tests show that when no sulfuric acid is used and phosphoric acid is fed at ambient temperatures (80° F.), the polyphosphate content of the fluid is only about 15 percent. Therefore, there are major advantages in the use of sulfuric acid in combination with merchant-grade phosphoric acid to supply chemical heat to the process so that a greater conversion of orthophosphate to polyphosphate can be realized.

When sulfuric acid, phosphoric acid, and ammonia are fed to the pipe reactor, it produces a melt and subsequently a liquid fertilizer; then after adding a predetermined amount of clay, a base suspension is produced. The base liquid is a true solution containing a predetermined amount of clay and, upon standing for a period of about 1 to 2 weeks, it is a base suspension that contains a large amount of small crystals. The reaction of sulfuric acid and phosphoric acid with ammonia provides a higher temperature in the pipe reactor than when the operation is carried out without sulfuric acid; this higher temperature results in higher levels of polyphosphate P$_2$O$_5$ in the melt and, therefore, higher polyphosphate levels in the liquid and suspension fertilizers made from the melt. Liquid fertilizers made by prior-art methods containing 50 percent or more polyphosphate P$_2$O$_5$ were either made from expensive superphosphoric acid or by heating merchant-grade phosphoric acid to very high temperatures (>300° F.) where expensive exotic heat exchangers are required to withstand the hot corrosive acid. Ammonium polyphosphate sulfate liquids and suspensions have lower solidification temperatures than similar liquids or suspensions currently known by those skilled in the art. The present invention has agronomic advantage of having sulfur in the product liquid or suspension.

We have now discovered a way to produce a suspension fertilizer that is free-flowing and fluid at temperatures below −20° F. while utilizing the relatively inexpensive merchant-grade wet-process acid in the production of a concentrated ammonium polyphosphate sulfate suspension fertilizer free of unavailable $P_2O_5$ that can be produced in equipment much simpler and less complicated than that described by Getsinger in U.S. Pat. No. 3,382,059, by Meline et al in U.S. Pat. No. 3,733,191, or by Ellis et al in U.S. Pat. No. 3,185,075, supra. Our process utilizes an improved, enlarged pipe-cross reactor which utilizes process energy only. Our discovery is that by incorporating polyphosphate and sulfate in the fluid, we are able to produce suspensions that have excellent low-temperature storage capabilities and by carrying out the reaction in a simple pipe-cross reactor, we are able to simplify the entire process for making suspensions that should have wide usage throughout the United States without regard to extremes in the weather.

In order that those skilled in the art may better understand how the present invention can be practiced, our invention is described below together with further objectives and advantages thereof, which will be better understood from a consideration of the following drawings, descriptions, and illustrative examples.

FIG. 2 is a drawing illustrating the pipe-cross reactor mixing device that is an apparatus that is as small and effective as possible and utilizes the heat available which is transformed into producing high level polyphosphate fluid fertilizers. The data in Table II and sizes in this FIGURE allows those skilled in the art to scale-up the pipe-cross reactor for commercial size plants.

Figure 1:
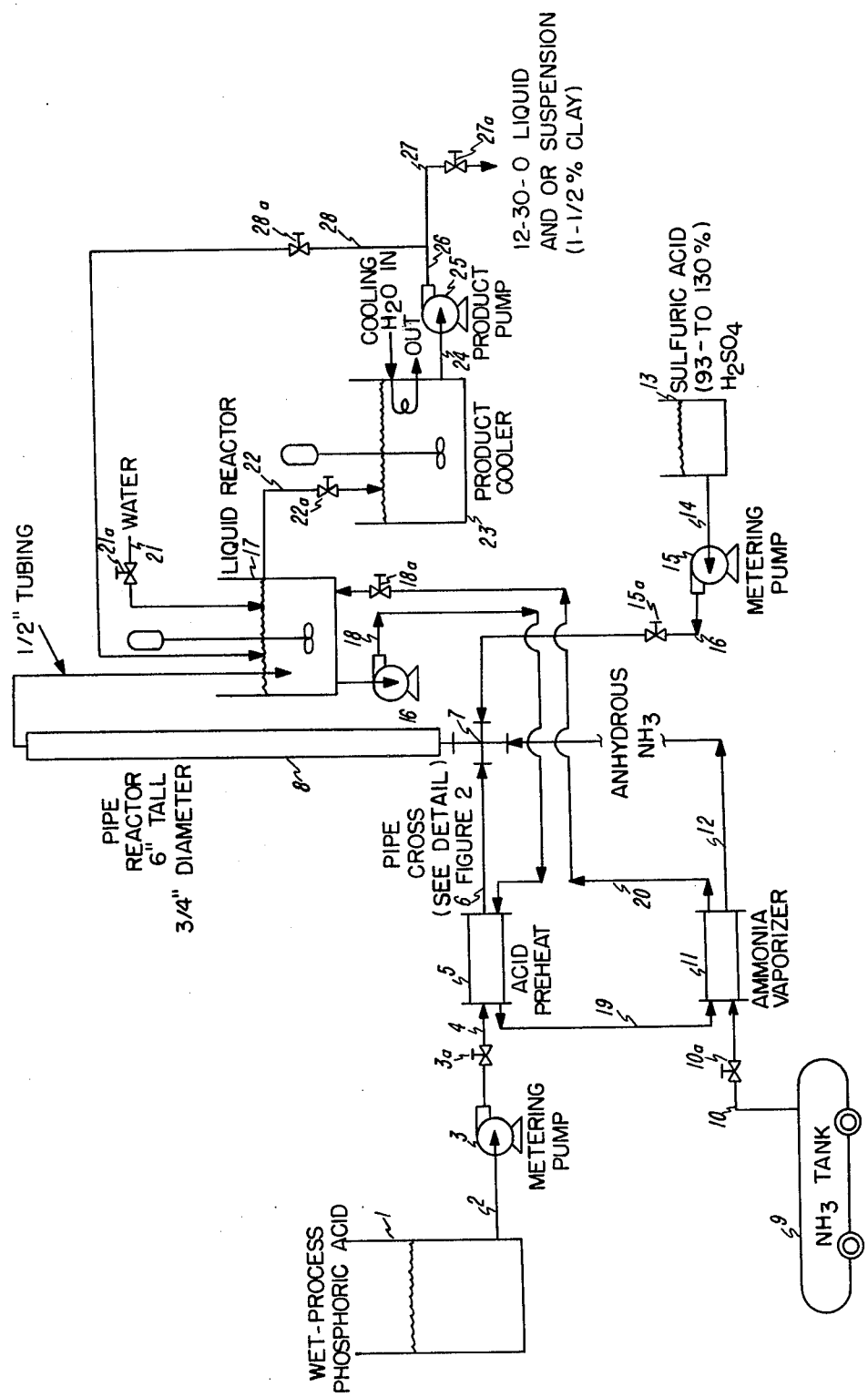
FIG. 1 is a flowsheet generally illustrating the principles of the process used to produce our new, novel ammonium polyphosphate sulfate liquid or suspension.

Referring now more specifically to FIG. 1, merchant-grade wet-process phosphoric acid is stored in and fed from tank 1 via line 2 to metering means 3, means for control of flow 3a, through line 4 to acid heater 5. From acid heater 5 the acid goes through line 6 to tee 7 and on to enlarged pipe reactor 8. Liquid ammonia from storage tank 9 is fed via line 10, means for control of flow 10a, to ammonia vaporizer 11 and on through line 12 to cross 7 and pipe reactor 8. Sulfuric acid is stored in and fed from tank 13 via line 14 to metering means 15, means for control of flow 15a, through line 16 to cross 7 and pipe reactor 8. After ammoniation of the sulfuric and wet-process phosphoric acids in pipe reactor 8, the resulting ammonium polyphosphate sulfate melt flows into liquid reactor tank 17. The heat required for acid heater 5 and ammonia vaporizer 11 comes from the hot ammonium polyphosphate liquid in liquid reactor tank 17. The transfer of heat takes place by pumping hot ammonium polyphosphate sulfate liquid from liquid reactor tank 17 via line 15 to pump 16, means for control of flow 18a through line 18 to acid heater 5; the hot ammonium polyphosphate sulfate liquid leaves acid heater 5 via line 19 and enters ammonia vaporizer 11. From here the liquid is fed back to liquid reactor tank 17 via line 20. Water of formulation from a source not shown enters via line 21 and passes through means of flow control 21a to dissolve ammonium polyphosphate sulfate melt in liquid reactor 17. The hot ammonium polyphosphate sulfate liquid from liquid reactor 17 is fed via line 22 and means for control of flow 22a to cooler 23. Any type cooler can be used if the liquid does not contain crystals and in this FIGURE, a vessel containing coils through which water is the cooling medium, is shown for illustrative purposes only. Cooler 23 cools the incoming hot ammonium polyphosphate liquid that enters cooler 23 via line 22. The cooling water from cooler 23 is disposed via any conventional means. The cooled ammonium polyphosphate sulfate liquid leaves cooler 23 via line 24 through pump 25 through line 26 to lines 27 and 28 where the stream is split. Part of the cooled ammonium polyphosphate sulfate slurry flows through line 28, means for control of flow 28a, and back to liquid reactor tank 17 for cooling purposes. Line 27 carries the remainder of the cooled ammonium polyphosphate sulfate slurry from cooler 23, through means for control of flow 27a, to a storage tank not shown.

In our studies, the liquids and suspensions that were considered to be satisfactory were at least 98 percent pourable at 80° F. and had viscosities that did not exceed 1000 centipoises at 80° F. or 1500 centipoises at 32° F. Satisfactory suspensions also contained no plus 20-mesh (800-micron) crystals and no crystals that settled and packed on the bottom of the container during quiescent storage. The maximum limit of settled crystals, after the vibration test (described in Example I, U.S. Pat. No. 4,066,432, Jones), was set at 2 percent by volume. Clear liquid that formed on top of the suspensions during quiescent storage was considered undesirable but the products were not ruled unsatisfactory because sparging or recirculation would remix them. Additionally, it was thought that if the fluids could be cooled to 80° F. or lower without crystals being present, the product cooler could function continuously without crystals fouling the cooling surface. Thus, each solution was evaluated as produced to see if crystals were present at 80° F. If crystals were present in the "as produced" liquid at 80° F., the suspension was judged unsatisfactory. From an economic standpoint, the most desirable fluid is the most concentrated (weight percent $N+P_2O_5$) fluid that can be produced without crystals being present at 80° F. Also, the solidification temperature of each suspension was determined to evaluate when the suspension becomes too viscous to flow. No minimum temperature has been established, but the lower the solidification temperature, the colder the climate the suspension can be stored in without encountering handling problems. For instance, 13-38-0 grade ammonium orthophosphate suspension can be handled at temperatures down to about 15° F. to 20° F., but then it solidifies. The presence of the polyphosphate and sulfate in our solutions and suspensions allows them to be handled at temperatures well below 0° F.

In order that those skilled in the art may better understand how the present invention can be practiced, the following examples of runs we have made in our continuous-type apparatus to produce ammonium polyphosphate sulfate suspensions from wet-process orthophosphoric acid and sulfuric acid are given by way of illustration and not necessarily by way of limitation.

Merchant-grade phosphoric acids used in the examples infra had the following compositions as shown in Table I below. The sulfuric acid used in the examples was chemically pure sulfuric acid diluted with water to desired concentrations.

TABLE I

Composition of Merchant-Grade Acids Used in Tests

| Acid designation | Chemical analysis, % by weight | | | | | |
|---|---|---|---|---|---|---|
| | $P_2O_5$ | $Fe_2O_3$ | $Al_2O_3$ | F | MgO | $SO_4$ |
| KM | 53.5 | 1.6 | 1.4 | 1.1 | 0.7 | 2.5 |
| T | 52.2 | — | — | — | — | — |
| Mixed-1 | 53.4 | — | — | — | — | — |
| Mixed-2 | 52.9 | — | — | — | — | — |

Examples I, II, and III illustrate the importance of our invention where utilization of all of the heat of reactions of ammonia with phosphoric acid and sulfuric acid in a small but effective reactor produced a high level of nonorthophosphate $P_2O_5$ in the product liquid which has a desirable level of plant food present.

Again referring more specifically to FIG. 1, Example I illustrates operation and the effectiveness of the pipe-cross reactor without sulfuric acid. Examples II and III show the effectiveness of the reactor with use of sulfuric acid in producing a highly desirable liquid containing high levels of polyphosphate $P_2O_5$.

It should be noted that the equipment used to produce the suspensions in all three examples was not set up or operated to obtain maximum utilization of the heat generated in all areas of the process and that the important areas for heat conservation were simulated by using steam to provide the heat. Also, in these tests, a coil immersed in a tank was used to cool the liquid first before attapulgite clay was added batchwise to the liquids to produce a base suspension which was used to produce N-P-K grade suspensions.

EXAMPLE I

This example is illustrative of how our process can be used to produce ammonium polyphosphate sulfate suspension fertilizer from impure merchant-grade wet-process phosphoric acid and sulfuric acid. The phosphoric acid used in these tests contained 53.5 percent $P_2O_5$ which is in the range considered to be merchant grade. Test A in Table II, infra, is illustrative of a run in which fluids of the proper concentration are made in which no crystals are present at 80° F. In this test (test A) a 12.8-31.5-0-3.0S was produced from acids (wet-process orthophosphoric and sulfuric) that were fed to the cross reactor at about 80° F. The resulting polyphosphate $P_2O_5$ of this product was about 45 percent of the total $P_2O_5$. The liquid contained 3 percent sulfur, which is a much needed secondary nutrient for plant growth. The liquid was used to produce a 9-25-3-2S solution grade fertilizer which is an excellent starter fertilizer and can be injected in the soil for early growth of corn and other crops. It provides the four needed nutrients of an excellent starter fertilizer, namely nitrogen, phosphorus, potassium, and sulfur. The polyphosphate level is high enough to provide excellent properties for storage and handling in cold climates and should be a more desirable starter fertilizer, because of the presence of sulfate, than the conventional 10-34-0 or 11-37-0 grade liquid which is made from expensive superphosphoric acid and the liquids made from this costly acid contain about 60 percent polyphosphate. Some of the 12.8-31.5-0-3S was used to produce a high-analysis suspension—a 14-14-14 grade. This material was stored for several weeks without formation of large crystals or excessive settling.

Usually when a 14-14-14 suspension is produced from an ammonium phosphate base (11-33-0 grade) which does not contain polyphosphates, the product becomes too viscous during storage. Sometimes this latter suspension becomes semisolid or has a large amount of solids which settles. All qualities of this type cause problems in handling and application. The 12.8-31.5-0-3S ammonium polyphosphate sulfate suspension was also used to produce an 8.2-20.1-20.1-2.0S suspension. This is a product that has excellent storage and physical characteristics except that its viscosity was slightly high. Later, another test was made in which a satisfactory 7.7-19-19-1.8S suspension grade was produced which had a viscosity of only 350 cP at 70° F. This product had excellent prolonged storage characteristics and was also easy to pump, handle, and apply uniformly. This should be an excellent suspension fertilizer for broadcasting and use for most fall crops.

In yet another test, a 12.5-30.7-0-3S-1 Zn-solution grade was produced by dissolving $ZnSO_4$ into the 12.8-31.5-0-3S. This should be an excellent solution fertilizer for use in the western corn and eastern wheat belt where these crops need N, $P_2O_5$, S, and Zn.

Test B in Table II indicates that when some of the process energy is used in combination with heats of reactions, a higher polyphosphate level liquid fertilizer may be produced without use of expensive, energy consuming superphosphoric acid. In test B, the phosphoric acid was heated to 180° F. and fed to the pipe-cross reactor with the 200° F. liquid from the liquid reactor; the sulfuric acid was not heated but was fed at about 80° F. to the pipe-cross reactor and after ammoniating, supra, an excellent 12.3-31.5-0-3S was produced that contained 52 percent of the $P_2O_5$ as polyphosphate. No crystals were present in this liquid as produced at 80° F. Some of the 12.3-31.5-0-3S was diluted with water to a 11.1-30.0-0-2.8S grade and stored at 40° F. At the end of 3 days storage at this temperature, the solution did not contain crystals. Some of the 12.3-31.5-0-3S was also made into an 11.9-30.7-0-3S suspension by the addition of 1½ percent clay. This suspension was stored at 0°, 32°, and 80° F. and evaluated. Results of the evaluation indicated that the suspension was satisfactory after 90 days of storage at 0°, 32°, and 80° F., as well as providing a suspension which has a solidification temperature of −25° F. This low solidification temperature allows handling and storage in very cold climates. Details showing the data from the evaluation up through the 90 days is shown in Table III.

Test C in Table II shows the effect of not adding sulfuric acid to the pipe-cross reactor on polyphosphate content in liquid produced in the same apparatus and made as in test A and test B. The phosphoric acid was preheated to 180° F., the same temperature as in test B, and was then fed to pipe and ammoniated. The resulting liquid fertilizer contained only 37 percent of the $P_2O_5$ as polyphosphate $P_2O_5$. In general, tests A and B versus test C show that the use of sulfuric acid provides an unexpected higher level of polyphosphate in liquids and thus increases the variety of fertilizer grades available.

TABLE II

Production of Ammonium Polyphosphate and Ammonium Polyphosphate Sulfates Utilizing a Pipe-Cross Reactor

| | Test No. | | |
|---|---|---|---|
| Pipe-cross reactor | A | B | C |
| Phosphoric acid | | | |
| Source | KM | KM | KM |
| Concentration, % $P_2O_5$ | 53.5 | 53.5 | 53.5 |
| Rate, lb/h | 39.6 | 39.6 | 39.6 |
| Temperature, °F. | 80 | 180 | 180 |

TABLE II-continued
Production of Ammonium Polyphosphate and Ammonium Polyphosphate Sulfates Utilizing a Pipe-Cross Reactor

| | Test No. | | |
|---|---|---|---|
| Pipe-cross reactor | A | B | C |
| Sulfuric acid | | | |
| Concentration, % H$_2$SO$_4$ | 95 | 95 | — |
| Rate, lb/h | 5.1 | 5.1 | 0 |
| Temperature, °F. | 80 | 80 | — |
| Ammonia | | | |
| Rate, lb/h | 10.3 | 10.5 | 10.3 |
| Temperature, °F. | 100 | 100 | 100 |
| Loading, lb-NH$_3$/h-in$^3$ | 0.268 | 0.268 | 0.268 |
| Diameter, in × lg, ft | ¾ × 6 | ¾ × 6 | ¾ × 6 |
| Temperature, °F, | 445 | 490 | 415 |
| Throughput flux | | | |
| Lb P$_2$O$_5$/h-in$^2$ | 39.7 | 39.7 | 39.7 |
| Lb P$_2$O$_5$/h-in$^3$ | 0.55 | 0.55 | 0.55 |
| Heat input to pipe cross | | | |
| Btu/h-in$^2$ | 36,000 | 40,000 | 35,000 |
| Btu/h-in$^3$ | 501 | 552 | 486 |
| Btu/lb-P$_2$O$_5$ | 907 | 1000 | 880 |
| Liquid reactor | | | |
| Temperature, °F. | 195 | 190 | 185 |
| Retention time, min. | 10 | 10 | 11 |
| Product cooler | | | |
| Temperature, °F. | 12 | 125 | 125 |
| Retention time, min | 13 | 13 | 15 |
| Liquid fertilizer | | | |
| Total N, % by wt | 12.8 | 12.3 | 11.6 |
| Total P$_2$O$_5$, % by wt | 31.5 | 31.5 | 33.8 |
| Total S, % by wt | 3.0 | 3.0 | 0.5$^a$ |
| D.A. P$_2$O$_5$, % by wt | 100 | 100 | 100 |
| N:P$_2$O$_5$ wt ratio | 0.406 | 0.390 | 0.343 |
| Polyphosphate, % of P$_2$O$_5$ | 44.8 | 52.4 | 37.3 |
| pH, (1 part liquid fertilizer per 4 parts H$_2$O) | 7.0 | 6.9 | 7.1 |
| Density, g/ml at 80° F. | 1.445 | 1.444 | 1.426 |
| Rate, lb/h | 69.1 | 69.1 | 64.0 |
| Crystals present as produced | No | No | No |

$^a$Calculated from analysis of feed acid

TABLE III
Storage Results of a 12-30-0-3S Ammonium Polyphosphate Sulfate Base Suspension

| | | | | | | | Pourability, % by vol | | | | | | Crystalline phases | | evalu- |
|---|---|---|---|---|---|---|---|---|---|---|---|---|---|---|---|
| % by wt N | % by wt P$_2$O$_5$ | % of P$_2$O$_5$ as polyphos-phate | % by wt S | Clay | pH | Visc. cP | No agi-ta-tion | Slight agi-tation | Clear | Set-tled | Temp. stored, °F. | Temp. eval, °F. | Present$^a$ | Largest size present, μ | ation,$^b$ S or U |
|---|---|---|---|---|---|---|---|---|---|---|---|---|---|---|---|
| Initial evaluation | | | | | | | | | | | | | | | |
| 11.9 | 30.7 | 52 | 3.05 | 1.5 | 6.6 | 130 | 100 | 100 | 0 | 0 | 80 | 32 | DAP | 50 × 350 × 350 | S |
| After 30 days storage | | | | | | | | | | | | | | | |
| 11.9 | 30.7 | — | 3.05 | 1.5 | 6.6 | 140 | 90 | 100 | 50 | 0 | 80 | 80 | DAP | 30 × 145 × 255 | S |
| 11.9 | 30.7 | — | 3.05 | 1.5 | — | 220 | 100 | 100 | 0 | 0 | 80 | 32 | DAP | 45 × 225 × 245 | S |
| 11.9 | 30.7 | — | 3.05 | 1.5 | 6.6 | 340 | 0 | 30 | 15 | 0 | 100 | 80 | DAP | 60 × 225 × 315 | S |
| 11.9 | 30.7 | — | 3.05 | 1.5 | — | 490 | 95 | 100 | 0 | 0 | 100 | 32 | DAP | 60 × 225 × 345 | S |
| 11.9 | 30.7 | — | 3.05 | 1.5 | — | 210 | 98 | 100 | 25 | 0 | 32 | 32 | DAP | 45 × 240 × 270 | S |
| 11.9 | 30.7 | — | 3.05 | 1.5 | — | 1060 | 98 | 100 | 0 | 0 | 0 | 0 | DAP | 20 × 200 × 300 | S |
| After 60 days storage | | | | | | | | | | | | | | | |
| 11.9 | 30.7 | — | 3.05 | 1.5 | 6.45 | 140 | 45 | 95 | 45 | 0 | 80 | 80 | DAP | 70 × 280 × 400 | S |
| 11.9 | 30.7 | — | 3.05 | 1.5 | — | 320 | 100 | 100 | 0 | 0 | 80 | 32 | DAP | 420 × 500 × 550 | S |
| 11.9 | 30.7 | — | 3.05 | 1.5 | 6.3 | 1110 | 15 | 45 | 15 | 0 | 100 | 80 | DAP | 100 × 330 × 400 | S |
| 11.9 | 30.7 | — | 3.05 | 1.5 | — | 1220 | 100 | 100 | 0 | 0 | 100 | 32 | DAP | 450 × 600 × 750 | S |
| 11.9 | 30.7 | — | 3.05 | 1.5 | — | 250 | 98 | 100 | 0 | 0 | 32 | 32 | DAP / MAP | 20 × 220 × 300 / 100 × 350 × 650 | S |
| 11.9 | 30.7 | — | 3.05 | 1.5 | — | 1030 | 90 | 100 | 0 | 0 | 0 | 0 | DAP / MAP | 10 × 200 × 300 / 200 × 200 × 600 | S |
| After 90 days storage | | | | | | | | | | | | | | | |
| 11.9 | 30.7 | — | 3.05 | 1.5 | 6.5 | 180 | 40 | 100 | 40 | 0 | 80 | 80 | DAP | 150 × 240 × 330 | S |
| 11.9 | 30.7 | — | 3.05 | 1.5 | — | 350 | 100 | 100 | 0 | 0 | 80 | 32 | DAP | 50 × 200 × 270 | S |
| 11.9 | 30.7 | — | 3.05 | 1.5 | — | 320 | 100 | 100 | 0 | 0 | 32 | 32 | DAP | 50 × 200 × 250 | |
| 11.9 | 30.7 | — | 3.05 | 1.5 | — | 1260 | 100 | 100 | 0 | 0 | 0 | 0 | DAP MAP | 50 × 250 × 350 / 100 × 100 × 400 | S |

$^a$DAP = Diammonium phosphate; MAP = monoammonium phosphate.
$^b$S = Satisfactory suspension; U = Unsatisfactory suspension.

EXAMPLE II

This example (Table IV) is negative data and is illustrative of how our process is new and unique. This example shows typical liquids which are produced when the sulfuric acid is not fed to the pipe-cross reactor. This example further shows that the concentration (% N+% P$_2$O$_5$) of the fluid is lowered to maintain a liquid in which no crystals are present at 80° F. Also this example illustrates that the polyphosphate level of the liquid produced without the sulfuric acid is significantly lower than when the sulfuric acid is added. The solidification temperature is much higher when no sulfuric acid is added to the pipe or when the sulfate is present in the liquid.

Test D in Table IV is a negative example and shows that when only merchant-grade wet-process acid is fed to the pipe reactor and at a low temperature (80° F.) as compared to test A, Table II, a lower grade liquid (10.1-31.1-0; no sulfur versus 12.8-31.5-0; 3.1 percent sulfur) was made. This 10.1-31.1-0 liquid was not crystal free at 80° F. and had to be made into a suspension fertilizer. In test D, Table IV, the polyphosphate level is significantly lower (13 versus 45 percent of total P$_2$O$_5$) which contributes to the higher solidification temperature (0° F. versus −25° F.) when our new and unique mode and apparatus are not used.

Test E is another negative example and is similar to test D except a larger pipe reactor was used to show that the cause of the better quality fertilizer with higher polyphosphate level is made in our new invention and not in a larger pipe downstream of the instant invention. In test E, only 15 percent polyphosphate level was obtained and thus the enlargement of the pipe reactor (4-inch-diameter pipe versus 6-inch-diameter pipe) produced about the same polyphosphate content. The 9.3-32.0-0 liquid in test E was crystal free at 80° F. and had a solidification temperature of −4° F. which is still significantly higher than with our apparatus.

TABLE IV

Production of Ammonium Polyphosphates Utilizing a Pipe Reactor

| | Test No. | |
|---|---|---|
| Pipe reactor | D | E |
| Phosphoric acid | | |
| Source | mixed-1 | mixed-2 |
| Concentration, % P$_2$O$_5$ | 53.4 | 52.9 |
| Rate, lb/h | 1150 | 1196 |
| Temperature, °F. | 90 | 82 |
| Sulfuric acid | | |
| Concentration, % H$_2$SO$_4$ | — | — |
| Rate, lb/h | 0 | 0 |
| Temperature, °F. | — | — |
| Ammonia | | |
| Rate, lb/h | 226 | 233 |
| Temperature, °F. | 120 | 120 |
| Loading, lb-NH$_3$/h-in$^3$ | 0.247 | 0.112 |
| Diameter, in × 1g, ft | 4 × 6 | 6 × 6 |
| Temperature, °F. | 443 | 430 |
| Throughput | | |
| Lb P$_2$O$_5$/h-in$^2$ | 48.2 | 21.9 |
| Lb P$_2$O$_5$/h-in$^3$ | 0.67 | 0.30 |
| Heat input | | |
| Btu/h-in$^2$ | 34,400 | 17,100 |
| Btu/h-in$^3$ | 553 | 238 |
| Btu/lb-P$_2$O$_5$ | 791 | 780 |
| Liquid reactor | | |
| Temperature, °F. | 165 | 147 |
| Retention time, min | 20 | 20 |
| Product cooler | | |
| Temperature, °F. | 122 | 118 |
| Retention time, min | 20 | 20 |
| Liquid fertilizer | | |
| Total N, % by wt | 10.1 | 9.3 |
| Total P$_2$O$_5$, % by wt | 31.1 | 32.0 |
| D.A. P$_2$O$_5$, % by wt | 100 | 100 |
| N:P$_2$O$_5$ wt ratio | 0.325 | 0.291 |
| Polyphosphate, % of P$_2$O$_5$ | 13 | 15 |
| pH, (1 part liquid fertilizer per 4 parts H$_2$O) | 6.5 | 6.1 |
| Density, g/ml at 80° F. | — | — |
| Rate, lb/h | 2000 | 2000 |
| Crystals present as produced | No | No |

EXAMPLE III

This example is illustrative of concentration and polyphosphate levels of fluids which can be made in a common pipe reactor described by Meline et al (U.S. Pat. No. 3,775,534) with merchant-grade acid. In tests F and G, Table V, when merchant-grade wet-process phosphoric acid was fed to the pipe reactor (as per Meline) at 80° F. and also at 150° F., only 2 and 4 percent polyphosphate liquids, respectively, were made. These liquids could not be handled in cold climates because of the high solidification temperatures (>0° F.).

TABLE V

Production of Ammonium Polyphosphates Utilizing Meline's Prior Art

| | Test No. | |
|---|---|---|
| Pipe reactor | F | G |
| Phosphoric acid | | |
| Source | T | T |
| Concentration, % P$_2$O$_5$ | 52.2 | 52.2 |
| Rate, lb/h | 30.1 | 30.1 |
| Temperature, °F. | 80 | 150 |
| Sulfuric acid | | |
| Concentration, % H$_2$SO$_4$ | — | — |
| Rate, lb/h | 0 | 0 |
| Temperature, °F. | — | — |
| Ammonia | | |
| Rate, lb/h | 5.4 | 5.1 |
| Temperature, °F. | 100 | 100 |
| Loading, lb-NH$_3$/h-in$^3$ | 0.786 | 0.742 |
| Diameter, in × 1g, ft | ⅜ × 3 | ⅜ × 3 |
| Temperature, °F. | 370 | 385 |
| Throughput | | |
| Lb P$_2$O$_5$/h-in$^2$ | 82.3 | 82.9 |
| Lb P$_2$O$_5$/h-in$^3$ | 2.29 | 2.29 |
| Heat input | | |
| Btu/h-in$^2$ | 64,600 | 70,100 |
| Btu/h-in$^3$ | 1790 | 1950 |
| Btu/lb-P$_2$O$_5$ | 785 | 852 |
| Liquid reactor | | |
| Temperature, °F. | 175 | 175 |
| Retention time, min | 36 | 38 |
| Product cooler | | |
| Temperature, °F. | 100 | 100 |
| Retention time, min | 10 | 10 |
| Liquid fertilizer | | |
| Total N, % by wt | 9.5 | 9.1 |
| Total P$_2$O$_5$, % by wt | 33.4 | 34.0 |
| D.A. P$_2$O$_5$, % by wt | 100 | 100 |
| N:P$_2$O$_5$ wt ratio | 0.284 | 0.268 |
| Polyphosphate, % of P$_2$O$_5$ | 2 | 4 |
| pH, (1 part liquid fertilizer per 4 parts H$_2$O) | 6.1 | 6.0 |
| Density, g/ml at 80° F. | 1.409 | 1.408 |
| Rate, lb/h | 47.0 | 46.2 |
| Crystals present as produced | No | No |

EXAMPLE IV

This example illustrates the invention and compares the new and novel suspension with comparable liquids without sulfate but having the same N:P$_2$O$_5$ weight ratio; the presence of sulfate in combination with polyphosphate improves the solidification temperature and allows storage and handling of our new liquid and suspension at extremely low temperatures. This comparison is shown in tests H, I, and J in Table VI.

Test H is an example of our invention. The suspension has a N:P$_2$O$_5$ weight ratio (N is from NH$_3$ that reacted with the H$_3$PO$_4$) of 0.330 and a solidification temperature of −25° F. Another suspension (test I, Table VI) has the same percent P$_2$O$_5$, polyphosphate level, and N:P$_2$O$_5$ weight ratio; however, the solidification temperature is only −7° F., which is due to the higher sulfate level (3 percent versus 0.5 percent S). The effect of sulfate is clearly shown in tests H, I, and J where the polyphosphate level remains about the same and as the sulfur level increases from 0.5, 0.7, and 3 percent, the solidification temperature decreases (−7°, −13°, and −25° F.), respectively, in the liquids or suspensions.

Test K, Table VI, is an example where a high-quality suspension fertilizer (13-38-0 grade) containing no polyphosphate P$_2$O$_5$ but has 0.6 percent sulfur was produced by a process described by Jones in U.S. Pat. No. 4,066,432. This suspension has a solidification temperature of only 15° F. and is further illustrative of our invention.

TABLE VI
Effect of Sulfate Level on Solidification Temperature of Ammonium Polyphosphates

| Test No.[d] | Grade | Polyphosphate level, % of total $P_2O_5$ | $N:P_2O_5$ wt ratio (overall) | $N:P_2O_5$ wt ratio (where N is from the $NH_3$ that reacted with $H_3PO_4$) | Solidification temp. °F.[a] | % by wt Sulfur | % by wt Clay |
|---|---|---|---|---|---|---|---|
| H | 11.9–30.7-0 | 52 | 0.388 | 0.330 | −25 | 3.0[b] | 1.5 |
| I | 10.1–30.7-0 | 52 | 0.330 | 0.330 | −7 | 0.5[c] | 1.5 |
| J | 11.0–37.0-0 | 54 | 0.297 | 0.297 | −13 | 0.7[c] | 0 |
| K | 13.0–38.0-0 | 0 | 0.342 | 0.342 | 15 | 0.6[c] | 1.5 |

[a] Solidification temperature was determined by slowly decreasing the temperature of the liquid or suspension until solidification occurred; at this point the temperature was either constant or rose slightly.
[b] From sulfate in merchant-grade wet-process acid and sulfuric acid added before ammoniation; in all other samples the sulfur came from merchant-grade phosphoric acid.
[c] Derived from sulfate present in the starting merchant-grade wet-process acid.
[d] Test number is material produced by current invention; all other materials were derived from commercial sources.

After sifting and winnowing through the data supra, as well as other results of tests and operation of our new, novel, and improved method for production of ammonium polyphosphate sulfate liquids, we now present the accepted and preferred ranges for variables shown below.

| Variable | Operating range | Preferred range |
|---|---|---|
| $H_2SO_4$ feed temperature (to pipe-cross reactor), °F. | 32–100 | 50–80 |
| $H_3PO_4$ feed temperature (to pipe-cross reactor), °F. | 50–210 | 80–200 |
| $NH_3$ feed temperature, °F. | 50–200 | 75–190 |
| Pipe reactor temperature, °F. | 400–550 | 420–480 |
| Liquid reactor tank temperature, °F. | 150–220 | 160–200 |
| Retention time in liquid reactor tank, min | 60–60 | 7–35 |
| $N:P_2O_5$ weight ratio | 0.3–0.4 | 0.38–0.39 |
| Percent of total $P_2O_5$ as nonortho $P_2O_5$ | 10–60 | 25–50 |
| Cooler temperature, °F. | 90–150 | 95–120 |
| Percent total plant food (% N + % $P_2O_5$) | 40–47 | 41–42 |
| Percent sulfur | 1–8 | 2–3 |
| Pipe-cross reactor $NH_3$ loading, lb $NH_3$/h-in$^3$ | 0.1–0.5 | 0.2–0.3 |
| Throughput flux Lb $P_2O_5$/h-in$^2$ | 20–100 | 35–45 |
| Lb $P_2O_5$/h-in$^3$ | <0.1–1.0 | 0.5–0.6 |
| Base suspension solidification temp., °F. | about −25 | about −25 |

While we have shown and described particular embodiments of our invention, modifications and variations thereof will occur to those skilled in the art. We wish it to be understood, therefore, that the appended claims are intended to cover such modifications and variations which are within the true scope and spirit of our invention.

What we claim as new and desire to secure by Letters Patent of the United States is:

1. An improved process for preparing ammonium polyphosphate sulfate suspensions, which suspensions are eminently suitable for use in frigid climates, which process consists essentially of simultaneously supplying, at a temperature range of about 50° F. to about 200° F., a stream of anhydrous ammonia to the common pipe-cross section of a pipe-cross reactor, substantially all enthalpy added thereto over and above that supplied by the ambient temperature environment being supplied by heat exchange means communicating with a later mentioned liquid fertilizer reactor means; simultaneously supplying, at a temperature range of about 50° F. to about 200° F., a stream of merchant-grade phosphoric acid to the cross section of said pipe-cross reactor, said phosphoric acid having a $P_2O_5$ content in the range from about 50 percent to about 58 percent, substantially all enthalpy added thereto over and above that supplied by the ambient temperature environment being supplied by heat exchange means communicating with a later-mentioned liquid fertilizer reactor means; simultaneously supplying, at a temperature range of about 50° F. to about 100° F., a stream of sulfuric acid to said cross section of said pipe-cross reactor, said sulfuric acid containing from about 90 to about 130 percent by weight $H_2SO_4$, said streams of phosphoric acid and sulfuric acid contacting said anhydrous ammonia introduced into said common pipe section of said pipe-cross reactor at said cross section of said pipe-cross reactor at a temperature sufficiently high so that additional water is not necessary for continuous operation and in predetermined quantities relative to one another to effect in the resulting molten ammonium polyphosphate sulfate formed in a later-mentioned step an $N:P_2O_5$ ratio ranging from 0.35 to about 0.39; subsequently introducing reaction product resulting from contacting said anhydrous ammonia, phosphoric acid, and sulfuric acid into a vapor tube extension of said pipe-cross reactor to ensure continued intimate contact therebetween; subsequently discharging from the downstream end of said vaporization tubular extension an essentially anhydrous molten ammonium polyphosphate sulfate and introducing said discharged sulfate into liquid fertilizer reactor means; simultaneously with said introduction of said sulfate, introducing into said liquid fertilizer reactor means a stream of aqueous medium in quantities to supply water of formulation thereto sufficient to effect the formation of liquid fertilizers nominally of grades 12-30-0-(2-8)S; subsequently adding to said nominal grades of 12-30-0-(2-8)S about 1½ percent by weight gelling clay; intimately mixing said clay with said liquid fertilizer and effecting the formation of a resulting liquid fertilizer suspension product; said resulting liquid fertilizer suspension product characterized by the fact that the solidification temperature thereof is about −25° F.

2. As a new composition of matter an ammonium polyphosphate sulfate base liquid or suspension fertilizer having from about 10 to about 60 percent of the $P_2O_5$ values therein in the form of polyphosphate species, having a sulfur content of about 3 to about 8 percent, having an $N:P_2O_5$ weight ratio of about 0.38 to about 0.39, and having a solidification temperature of about −25° F.

* * * * *